(12) United States Patent
Giles

(10) Patent No.: US 11,714,635 B2
(45) Date of Patent: Aug. 1, 2023

(54) SYSTEMS AND METHODS FOR REMEDIATION OF SOFTWARE CONFIGURATION

(71) Applicant: Capital One Services, LLC, McLean, VA (US)

(72) Inventor: William Giles, Rhome, TX (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 13 days.

(21) Appl. No.: 17/520,574

(22) Filed: Nov. 5, 2021

(65) Prior Publication Data

US 2023/0141524 A1 May 11, 2023

(51) Int. Cl.
*G06F 8/71* (2018.01)
*G06F 8/60* (2018.01)
*G06F 11/36* (2006.01)

(52) U.S. Cl.
CPC ............. *G06F 8/71* (2013.01); *G06F 8/60* (2013.01); *G06F 11/3684* (2013.01); *G06F 11/3688* (2013.01); *G06F 11/3692* (2013.01)

(58) Field of Classification Search
None
See application file for complete search history.

(56) References Cited

U.S. PATENT DOCUMENTS

| | | | |
|---|---|---|---|
| 6,789,215 B1 | 9/2004 | Rupp et al. | |
| 7,506,038 B1 * | 3/2009 | Perrone | G06F 8/60 709/221 |
| 8,028,269 B2 * | 9/2011 | Bhatia | G06F 11/3604 717/106 |
| 9,094,434 B2 * | 7/2015 | Williams | H04L 63/0227 |
| 9,111,088 B2 * | 8/2015 | Ghai | G06F 21/55 |
| 9,124,639 B2 * | 9/2015 | Srinivasan | H04L 63/0892 |
| 10,019,677 B2 * | 7/2018 | Gill | G06Q 10/067 |

(Continued)

OTHER PUBLICATIONS

Kikuchi, "Configuration Policy Extraction for Parameter Settings in Cloud Infrastructure Using UML/OCL Verification", 2013, IEEE (Year: 2013).*

(Continued)

*Primary Examiner* — Hossain M Morshed
(74) *Attorney, Agent, or Firm* — Troutman Pepper Hamilton Sanders LLP; Christopher J. Forstner; John A. Morrissett

(57) ABSTRACT

Systems and methods for remediation of software configurations are disclosed. The system may store a plurality of configuration policies in a compliance repository. The system may receive trigger data including at least one compliance error and indicating a software instance operating on a cloud service is out of compliance. The system may compare the at least one compliance error with the plurality of configuration policies. When at least one compliance error matches at least one configuration policy, the system may identify a software configuration file and apply the matching configuration policy to the software configuration file to remediate the software instance. When the at least one compliance error does not match at least one configuration policy, the system may generate a new configuration policy, validate the new configuration policy, and apply the new configuration policy to the software configuration file to remediate the software instance.

20 Claims, 5 Drawing Sheets

(56) References Cited

U.S. PATENT DOCUMENTS

| | | | |
|---|---|---|---|
| 10,021,138 B2* | 7/2018 | Gill | H04L 63/1416 |
| 10,541,867 B2* | 1/2020 | Velupillai | H04L 41/0681 |
| 10,680,913 B1 | 6/2020 | Achi Vasudevan et al. | |
| 10,817,611 B1 | 10/2020 | Glynn et al. | |
| 10,826,767 B2* | 11/2020 | Barkovic | G06F 16/2474 |
| 11,489,721 B2* | 11/2022 | Jagannathan | H04L 41/0895 |
| 2006/0179484 A1 | 8/2006 | Scrimsher et al. | |
| 2008/0172716 A1* | 7/2008 | Talpade | H04L 63/20 |
| | | | 726/1 |
| 2014/0013302 A1* | 1/2014 | Bisdikian | G06F 11/0709 |
| | | | 717/121 |
| 2019/0104156 A1* | 4/2019 | Barkovic | H04L 67/60 |
| 2021/0055927 A1 | 2/2021 | Sarukkai et al. | |
| 2021/0374767 A1* | 12/2021 | Kurian | G06F 40/30 |
| 2022/0229657 A1* | 7/2022 | Hussain | H04L 63/1433 |

OTHER PUBLICATIONS

Kikuchi et al., "Configuration Policy Extraction for Parameter Settings in Cloud Infrastructure Using UML/OCL Verification", 2013, IEEE (Year: 2013).*

Chavan et al., "IaaS Cloud Security," Published in: 2013 International Conference on Machine Intelligence and Research Advancement; Dec. 2013.

International Search Report and Written Opinion in related PCT Application No. PCT/US2022/078955, dated Jan. 19, 2023.

* cited by examiner

SYSTEMS AND METHODS FOR REMEDIATION OF SOFTWARE CONFIGURATION

FIELD OF INVENTION

The present disclosure relates to systems and methods for remediation of software configurations, more particularly for identifying a software compliance error based on trigger data, and remediating the software compliance error by applying an existing configuration policy or generating a new configuration policy based at least in part on an existing configuration policy.

BACKGROUND

Cloud computing has improved how businesses can implement complicated software packages that provide services to their customers. However, cloud computing has also made it more complicated for businesses to ensure that software instances being implemented in a cloud computing environment are complying in configuration policies that are required for regulatory compliance, legal compliance, and internal policy compliance. Software instances are initialized on the cloud computing service based on complicated configuration policies stored in configuration files. Currently, it is difficult to quickly and efficiently ensure software instances operating on an existing cloud service software are compliant with all necessary policies due to the difficulty in automating the maintenance of stored configuration files to ensure that cloud computing instances comply with the required policies when initialized based on the stored configuration files.

Accordingly, there is a need for systems and methods to identify an out of compliance software instance based on trigger data, identify an associated configuration file, and automatically remediate a compliance error based on generating and applying configuration policies to the software configuration file associated with the out of compliance software instance. Embodiments of the present disclosure are directed to this and other considerations.

SUMMARY

Disclosed embodiments provide systems and methods for remediating a computer software configuration.

Consistent with the disclosed embodiments, various methods and systems are disclosed. In an embodiment, a system performing a method for remediating a computer software configuration is disclosed. The method may include storing a plurality of configuration policies in a compliance repository. The method may include receiving trigger data, wherein the trigger data may indicate a first software instance is out of compliance. The trigger data may include a first software instance identifier, and at least one first compliance error. The method may include comparing the at least one first compliance error with the configuration policies stored in the compliance repository. In response to the at least one first compliance error matching at least one configuration policy stored on the compliance repository beyond a first predetermined threshold, the method may include identifying a first software configuration file based on the first software instance identifier, and applying the at least one matching configuration policy to the first software configuration file to remediate the first software instance. In response to the at least one first compliance error not matching at least one configuration policy beyond the first predetermined threshold, the method may include generating a new configuration policy based at least in part on the at least one first compliance error, validating the new configuration policy, and applying the new configuration policy to the first software configuration file to remediate the first software instance.

In another embodiment, a system performing a method for remediating a computer software configuration is disclosed. The method may include storing a plurality of configuration policies in a compliance repository. The method may include receiving trigger data, wherein the trigger data may indicate a first software instance is out of compliance. The trigger data may include a first software instance identifier, and at least one first compliance error. The method may include comparing the trigger data with the configuration policies stored in the compliance repository. In response to the trigger data matching at least one configuration policy stored on the compliance repository beyond a first predetermined threshold, the method may include identifying a first software configuration file based on the first software instance identifier, and applying the at least one matching configuration policy to the first software configuration file to remediate the first software instance.

Further features of the disclosed design, and the advantages offered thereby, are explained in greater detail hereinafter with reference to specific embodiments illustrated in the accompanying drawings, wherein like elements are indicated be like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

The systems and methods described herein are necessarily rooted in computer technology as they relate to improving the functioning of computer software configuration systems. For example, the systems and methods may determine whether received trigger data indicates a software compliance error that can be remediated using an existing configuration policy. When the trigger data indicates a software compliance error that can be remediated using an existing software policy, the system can update the software configuration file associated with the out of compliance software instance. However, when the trigger data indicates a software compliance error that cannot be remediated using an existing software policy, the system may generate a new configuration policy, thereby avoiding the use of excess computing processing power and network traffic volume by limiting the generation of new configuration policies to those cases when a pre-existing software configuration policy cannot remediate the software compliance error.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Reference will now be made in detail to example embodiments of the disclosed technology, examples of which are illustrated in the accompanying drawings and disclosed herein. Wherever convenient, the same references numbers will be used throughout the drawings to refer to the same or like parts.

Figure 1:
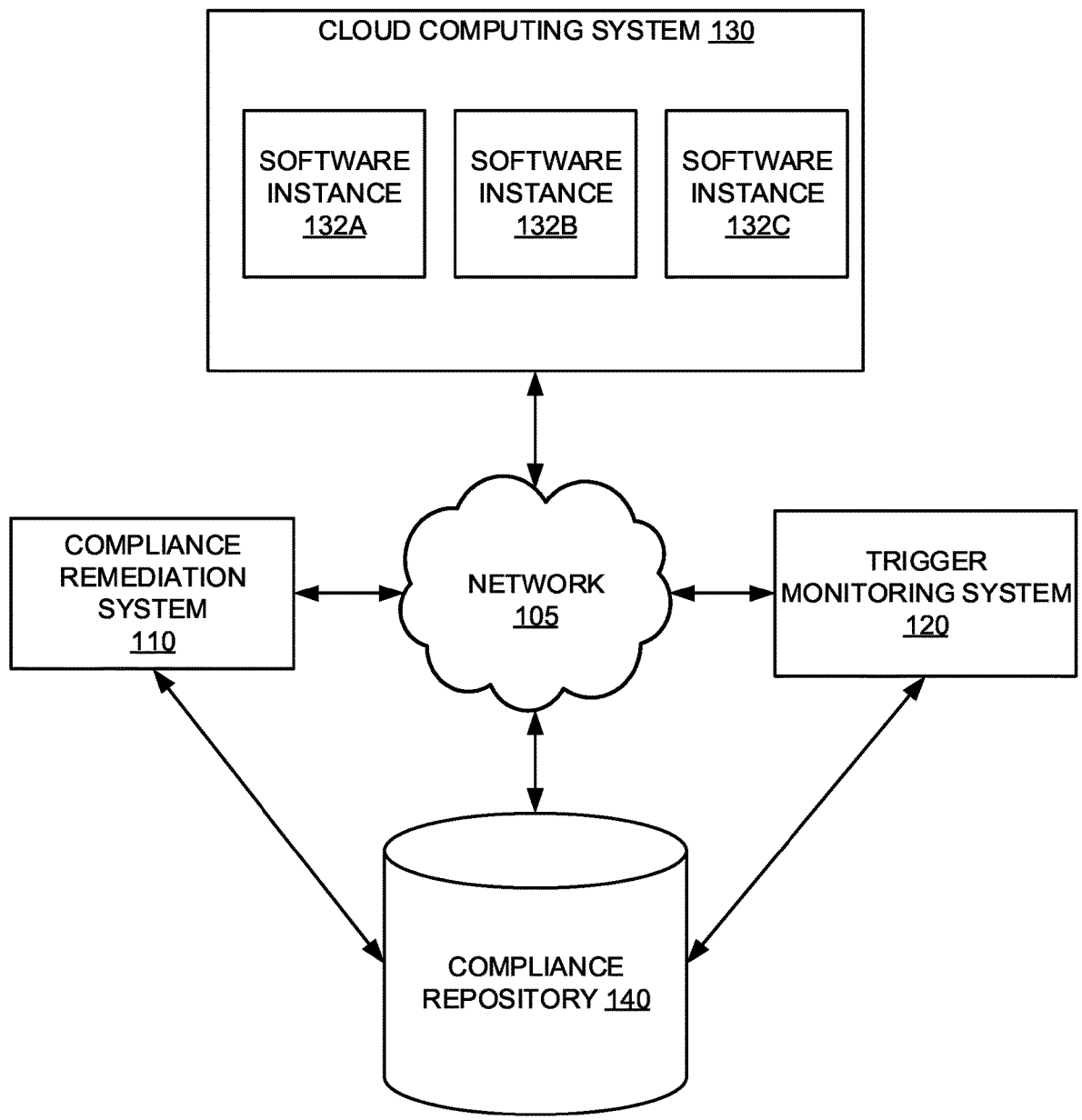
FIG. 1 is a diagram of an example system environment that may be used to implement one or more embodiments of the present disclosure.

FIG. 1 is a diagram of an example system environment that may be used to implement one or more embodiments of the present disclosure. The components and arrangements shown in FIG. 1 are not intended to limit the disclosed embodiments as the components used to implement the disclosed processes and features may vary.

In accordance with disclosed embodiments, system 100 may include a compliance remediation system 110 in communication with a trigger monitoring system 120, cloud computing system 130, and via network 105. In some embodiments, compliance remediation system 110 may also be in communication with various databases, such as compliance repository 140. Compliance remediation system 110 may be a mobile computing device (e.g., a smart phone, tablet computer, smart wearable device, portable laptop computer, voice command device, wearable augmented reality device, or other mobile computing device) or a stationary device (e.g., desktop computer).

Network 105 may be of any suitable type, including individual connections via the internet such as cellular or WiFi networks. In some embodiments, network 105 may connect terminals using direct connections such as radio-frequency identification (RFID), near-field communication (NFC), Bluetooth™, low-energy Bluetooth™ (BLE), WiFi™, ZigBee™, ambient backscatter communications (ABC) protocols, USB, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Figure 2:
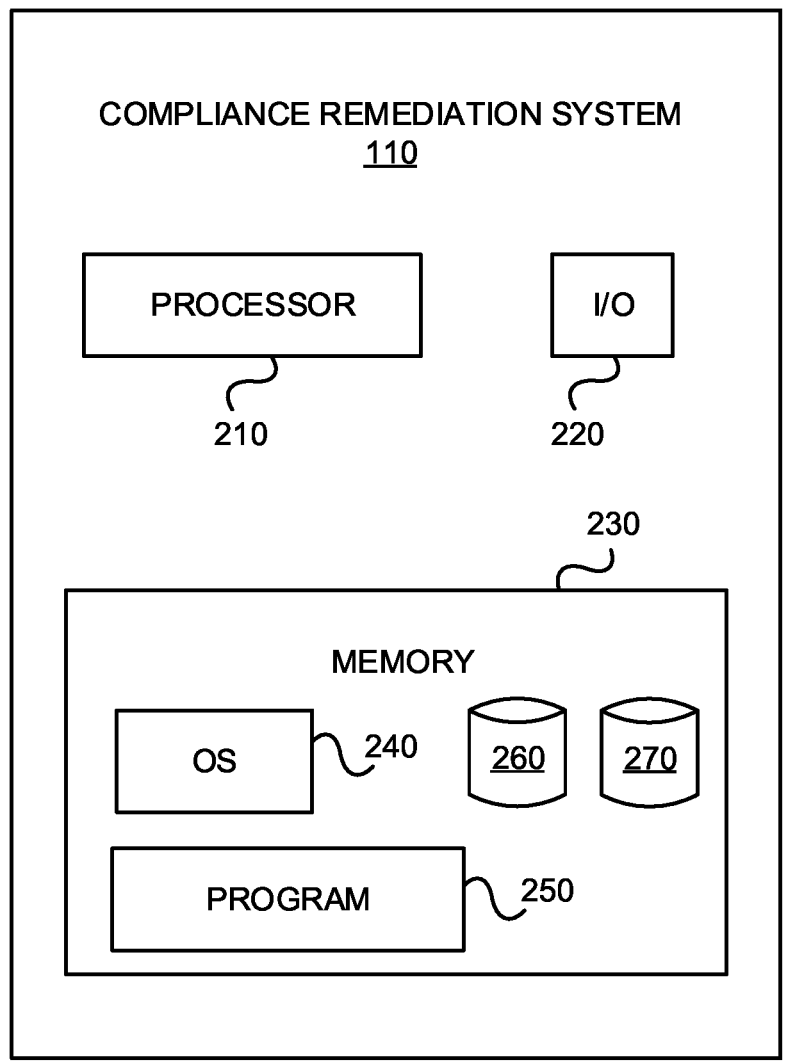
FIG. 2 is a component diagram of a compliance remediation system according to an example embodiment.

An example embodiment of compliance remediation system 110 is shown in more detail in FIG. 2. Trigger monitoring system 120 and/or cloud computing system 130 may have a similar structure and components that are similar to those described with respect to compliance remediation system 110. As shown, compliance remediation system 110 may include a processor 210, an input/output ("I/O") device 220, a memory 230 containing an operating system ("OS") 240 and a program 250. For example, compliance remediation system 110 may be a single server or may be configured as a distributed computer system including multiple servers or computers that interoperate to perform one or more of the processes and functionalities associated with the disclosed embodiments. In some embodiments, compliance remediation system 110 may further include a peripheral interface, a transceiver, a mobile network interface in communication with processor 210, a bus configured to facilitate communication between the various components of the compliance remediation system 110, and a power source configured to power one or more components of compliance remediation system 110.

A peripheral interface may include the hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area network. In some embodiments, a mobile network interface may include hardware, firmware, and/or software that allows processor(s) 210 to communicate with other devices via wired or wireless networks, whether local or wide area, private or public, as known in the art. A power source may be configured to provide an appropriate alternating current (AC) or direct current (DC) to power components.

As described above, compliance remediation system 110 may configured to remotely communicate with one or more other devices, such as trigger monitoring system 120. According to some embodiments, compliance remediation system 110 may utilize a rules-based platform (e.g., algorithmic rules stored on compliance repository 140) and/or trained a machine learning model to remediate one or more software compliance errors associated with a software configuration file.

Processor 210 may include one or more of a microprocessor, microcontroller, digital signal processor, co-processor or the like or combinations thereof capable of executing stored instructions and operating upon stored data. Memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 230.

Processor 210 may be one or more known processing devices, such as a microprocessor from the Pentium™ family manufactured by Intel™ or the Turion™ family manufactured by AMD™. Processor 210 may constitute a single core or multiple core processor that executes parallel processes simultaneously. For example, processor 210 may be a single core processor that is configured with virtual processing technologies. In certain embodiments, processor 210 may use logical processors to simultaneously execute and control multiple processes. Processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

Compliance remediation system 110 may include one or more storage devices configured to store information used by processor 210 (or other components) to perform certain functions related to the disclosed embodiments. In one example, compliance remediation system 110 may include memory 230 that includes instructions to enable processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, compliance remediation system 110 may include memory 230 that includes instructions that, when executed by processor 210, perform one or more processes consistent with the functionalities disclosed herein. Methods, systems, and articles of manufacture consistent with disclosed embodiments are not limited to separate programs or computers configured to perform dedicated tasks. For example, compliance remediation system 110 may include memory 230 that may include one or more programs 250 to perform one or more functions of the disclosed embodiments. Moreover, processor 210 may execute one or more programs 250 located remotely from compliance remediation system 110. For example, compliance remediation system 110 may access one or more remote programs 250, that, when executed, perform functions related to disclosed embodiments.

Memory 230 may include one or more memory devices that store data and instructions used to perform one or more features of the disclosed embodiments. Memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational databases. Memory 230 may include software components that, when executed by processor 210, perform one or more processes consistent with the disclosed embodiments. In some embodiments, memory 230 may include a software configuration database 260 for storing software configuration files that allow the system to initialize software instances on a cloud service (e.g., cloud computing system 130) that comply with one or more policies and a software compliance database 270 for storing rules and policies for software compliance to enable compliance remediation system 110 to perform one or more of the processes and functionalities associated with the disclosed embodiments.

Compliance remediation system 110 may also be communicatively connected to one or more memory devices (e.g., databases (not shown)) locally or through a network. The remote memory devices may be configured to store information and may be accessed and/or managed by compliance remediation system 110. By way of example, the remote memory devices may be document management systems, Microsoft™ SQL database, SharePoint™ databases, Oracle™ databases, Sybase™ databases, or other relational databases. Systems and methods consistent with disclosed embodiments, however, are not limited to separate databases or even to the use of a database.

Compliance remediation system 110 may also include one or more I/O devices 220 that may include one or more interfaces for receiving signals or input from devices and providing signals or output to one or more devices that allow data to be received and/or transmitted by compliance remediation system 110. For example, compliance remediation system 110 may include interface components, which may provide interfaces to one or more input devices, such as one or more keyboards, mouse devices, touch screens, track pads, trackballs, scroll wheels, digital cameras, microphones, sensors, and the like, that enable compliance remediation system 110 to receive data from one or more users or devices (such as via trigger monitoring system 120).

In example embodiments of the disclosed technology, compliance remediation system 110 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While compliance remediation system 110 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the compliance remediation system 110 may include a greater or lesser number of components than those illustrated.

Figure 3:
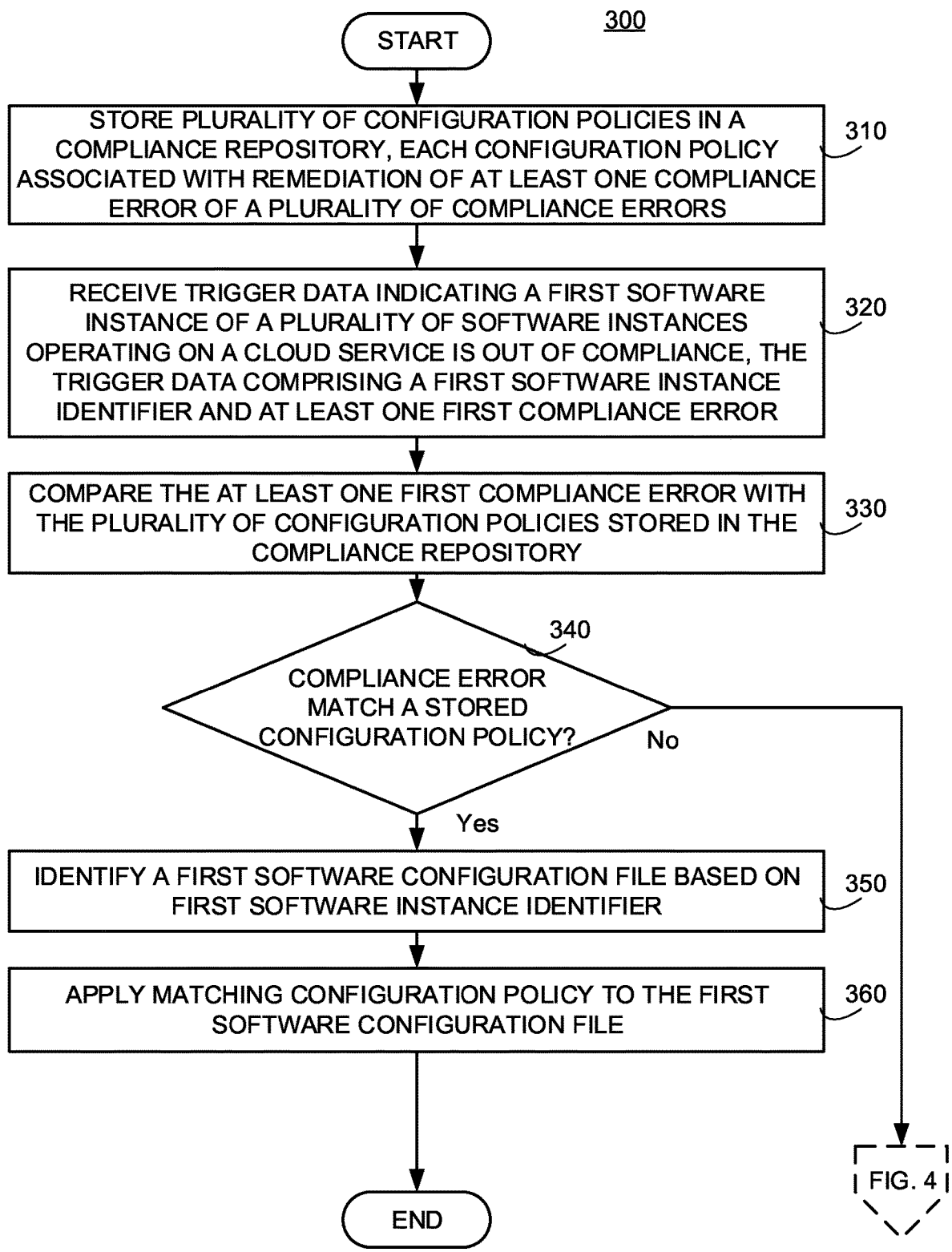
FIG. 3 is a flowchart of a method for remediating a computer software configuration, according to an example embodiment.

FIG. 3 is a flowchart of a method for remediating a computer software configuration, according to an example embodiment. Although method 300 may be performed by the compliance remediation system 110, the trigger monitoring system 120, cloud computing system 130, and/or compliance repository 140, or a combination thereof, the method is described as being performed by the compliance remediation system 110 for ease of reference.

In block 310 of method 300, the compliance remediation system 110 may store a plurality of configuration policies in a compliance repository (e.g., compliance repository 140). Each configuration policy stored in compliance repository 140 may be associated with the remediation of at least one compliance error that has previously been stored on the compliance repository 140. For example, when a new regulation or policy is created that a software instance operating in a cloud service (e.g., cloud computing system 130) must follow, the policy may be stored in the compliance repository 140. The policy may include one or more code arguments that are configured to modify one or more aspects of a software configuration file used to initialize a software instance on the cloud service. Once a policy is stored on the compliance repository 140, it may be used by one or more aspects of system 100 (e.g., trigger monitoring system 120) to, for example, identify a software instance that is out of compliance with the policies stored in the compliance repository. According to some embodiments, trigger monitoring system 120 can intermittently scan each software instance operating on cloud computing system 130 to determine whether any software instance (e.g., software instance 132A, 132B, 132C, etc.) are out of compliance with any policy stored on the compliance repository 140. In some embodiments, trigger monitoring system 120 can be manually triggered to address a new configuration policy. In other embodiments, trigger monitoring system 120 can automatically detect a change or addition to one or more policies stored on compliance repository 140 and automatically initiate a scan of the cloud computing system 130 to determine whether any software instance is out of compliance with the new or updated policies.

In block 320, the system (e.g., trigger monitoring system 120 and/or compliance remediation system 110) may receive trigger data. The trigger data may provide an indication to the system that a first software instance operating on a cloud service (e.g., cloud computing system 130) may be out of compliance with at least one policy stored on the compliance repository 140. According to some embodiments, the trigger data received by the system may include a software instance identifier that provides an indication to system 100 which software instance (e.g., software instance 132A, software instance 132B, software instance 132C, etc.) of the plurality of software instances operating on the cloud computing system is out of compliance with one or more policies stored on the compliance repository. According to some embodiments, the trigger data received by the system may include a compliance error. For example, the compliance error may include an indication that a software instance (e.g., software instance 132A) is leaking sensitive information in a datalogging event when the sensitive information should be masked in the datalog. In some instances, the compliance error may involve an out of date software dependency. For example, software instance 132A may be out of compliance because it relies upon another software package to operate, and the other software package is out of date. Software packages may be replaced with newer versions on a rolling basis to remediate security issues, software bugs, and other issues. Accordingly, the system may identify and remediate software issues arising from out of date software package dependencies. In some embodiments, the compliance error may include configuration errors associated with an out of compliance configuration file. For example, according to some embodiments, a software instance (e.g., software instance 132A, software instance 132B, software instance 132C, etc.) may be out of compliance due to a configuration file associated with the respective software instance being out of compliance. A software configuration file may be used to initialize a respective software instance on a cloud service (e.g., cloud computing system 130). When there an existing software configuration file is out of compliance, a software instance initialized on the cloud computing system 130 may include errors associated with the existing software configuration file. For example, a software configuration file used to initialize a respective software instance can be out of compliance by referencing an out of date or otherwise deprecated system or software package. In another example, a software configuration file can be out of compliance by referencing an out of date or otherwise deprecated cloud computing resource. A software configuration file can also be out of compliance by including code that has a known vulnerability. For example, compliance repository 140 may store a record of known vulnerabilities which the system may identify within an existing software configuration file.

According to some embodiments, the trigger data can include an indication that deploying a respective software instance (e.g., software instance 132A) may include a dependency or multiple dependencies to a separate software instance (e.g., software instance 132B and/or software instance 132C), and that a runtime associated with deploying the respective software instance (e.g., software instance 132A) exceeds a second predetermined threshold. For example, a first software instance may depend on aspects of a second software instance to properly function, and if the runtime associated with initializing the first software instance exceeds the second predetermined threshold, the system may resolve the error by identifying the software dependencies and storing the identified software dependencies in a local repository (e.g., by storing a copy of the identified software dependencies directly on software instance 132A of cloud computing system 130).

According to some embodiments, the compliance error may be related to one or more of an out of compliance Bogiefile configuration, an out of compliance Gearsfile configuration, or an out of compliance Dockerfile configuration. For example, a Bogiefile may be used by the system to manage and automate the initialization of software instances operating on a cloud service (e.g., software instance 132A, software instance 132B, software instance 132C, etc.). The system may trace the noncompliant software instance to an issue with a Bogiefile associated with the respective software instance. In another example, a Gearsfile may be used by a software instance operating on a cloud service to offer functionality typical of a desktop application through a web application. The compliance error may include an error associated with a functionality supported by the Gearsfile, and therefore the compliance error may be traced to an out of compliance Gearsfile. In another example, a Dockerfile may be used by a software instance operating on a cloud service to build a virtual image or "container" that may be used to initialize the respective software instance. When the software instance is being initialized, the associated Dockerfile aggregates all the instructions necessary to initialize and execute the software instance. The compliance error may be traced to a Dockerfile when the compliance error is associated with the cloud environment of the respective software instance. In some embodiments, the compliance error may be related to a JSON package file, a requirements text file, and/or other package dependency files. In some embodiments, the compliance error may be associated with a linting configuration file. A lint program associated with the linting configuration file may be used by various components of the system (e.g., compliance remediation system 110 and/or trigger monitoring system 120) to initialize a process of automatically checking software code for compliance errors.

In block 330, the system (e.g., compliance remediation system 110) may compare the at least one first compliance error with the plurality of configuration policies stored in the compliance repository. For example, each policy stored on the compliance repository may additionally include an error ID which is associated with a respective compliance error that the policy is configured to resolve. The compliance error may be compared to the error ID to determine whether the compliance error matches at least one of the configuration policies stored on the compliance repository 140. In another example, in order to compare the at least one first compliance error with the plurality of configuration policies stored in the compliance repository, the system (e.g., compliance remediation system 110) may convert the trigger data into trigger context vector (e.g., using a model such as word 2 vector, bag of words, and/or creating a document-term matrix), and additionally convert each of the configuration policies into a policy context vector. According to some embodiments, each context vector may additionally undergo a weighting scheme that weights certain words and/or characters of the input data more heavily than others when forming the context vector, for example using a TF-IDF algorithm to weight terms that show up in a respective input more heavily as a function of their frequency in the input document and relative infrequency when taking a different input.

In decision block 340, the system may determine whether the compliance error matches a configuration policy stored on the compliance repository 140 beyond a predetermined threshold. For example, the system (e.g., compliance remediation system 110) may determine a match based on a matching error ID, if provided. In other embodiments, the system may determine a trigger context vector and a plurality of policy context vectors based on the plurality of policies stored in the compliance repository 140. The system (e.g., compliance remediation system 110) may determine a cosine similarity between the trigger context vector and the plurality of policy context vectors, which includes assigning a value between 0 and 1 to each of the calculated cosine similarities. A value close to one may represent a near identical match, whereas a value of 0 may represent zero similarity. In some embodiments, a threshold value of 0.7 or above may indicate a match between the trigger context vector and a respective policy context vector. In response to determining a matching configuration policy stored on the compliance repository beyond a predetermined threshold, the method may move to block 350. In response to not determining a matching configuration policy stored on the compliance repository beyond the predetermined threshold, the method may move to FIG. 4, as will be described below.

In block 350, the system may identify a first software configuration file associated with the first software instance. For example, compliance remediation system 110 may determine the relevant first software configuration file based on the software instance identifier received as part of the trigger data in block 320 and/or based on a comparison of the generated trigger context vector with the plurality of policy context vectors.

In block 360, the system (e.g., compliance remediation system 110) may apply the at least one matching configuration policy to the first software configuration file to remediate the first software instance. For example, the identified matching configuration policy may include a number of standardized code arguments that may be applied to the first software configuration file. The code arguments may include instructions that modify the first software configuration file in a way that ensures that once a new virtual instance is initialized based on the first software configuration file, the new virtual instance will be free of the errors that were remediated by the matching configuration policy. According to some embodiments, standardized code arguments applied by the compliance remediation system 110 can include automatically updating package names, changing one or more values of a regex string, applying or modifying one or more configuration keys, and/or applying a file pattern for automatically naming one or more software files according to a predetermined ruleset.

Figure 4:
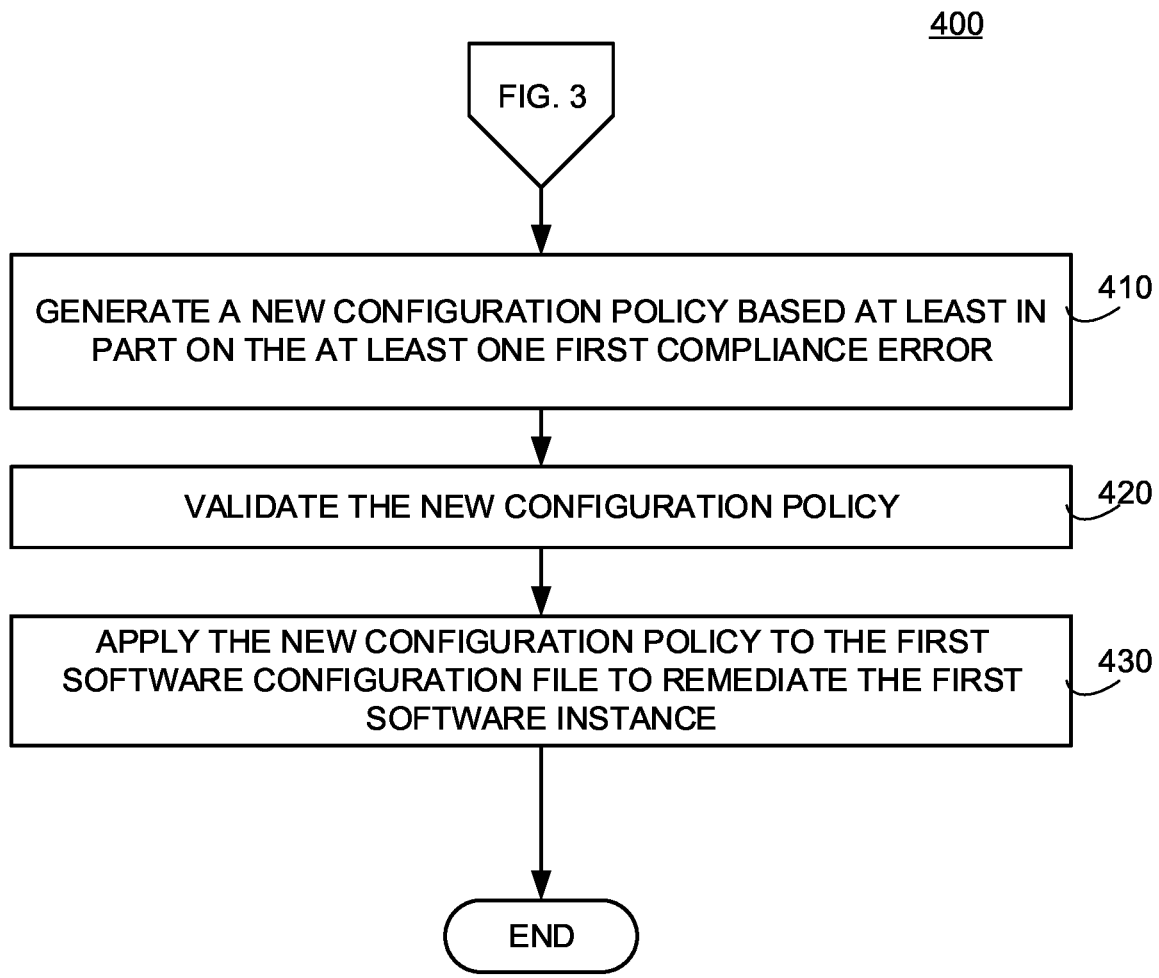
FIG. 4 is a flowchart of a method for generating a new configuration policy and remediating a computer software configuration with the new configuration policy, according to an example embodiment.

FIG. 4 is a flowchart of a method for generating a new configuration policy and remediating a computer software configuration with the new configuration policy, according to an example embodiment. The method of FIG. 4 may follow from a determination in decision block 340 of method 300 that the compliance error does not match a configuration policy stored on the compliance repository 140 beyond a predetermined threshold.

In block 410, the system (e.g., compliance remediation system 110) may generate a new configuration policy based at least in part on the first compliance error. For example, the system may identify the closest configuration policy based on the calculated cosine similarities of block 340, and algorithmically modify the closest configuration policy. An updated configuration context vector may be generated, and a new cosine similarity may be calculated between the trigger context vector and the updated configuration context vector. This process may be repeated until the calculated cosine similarity exceeds the threshold value, which according to some embodiments is a value of 0.7.

Figure 5:
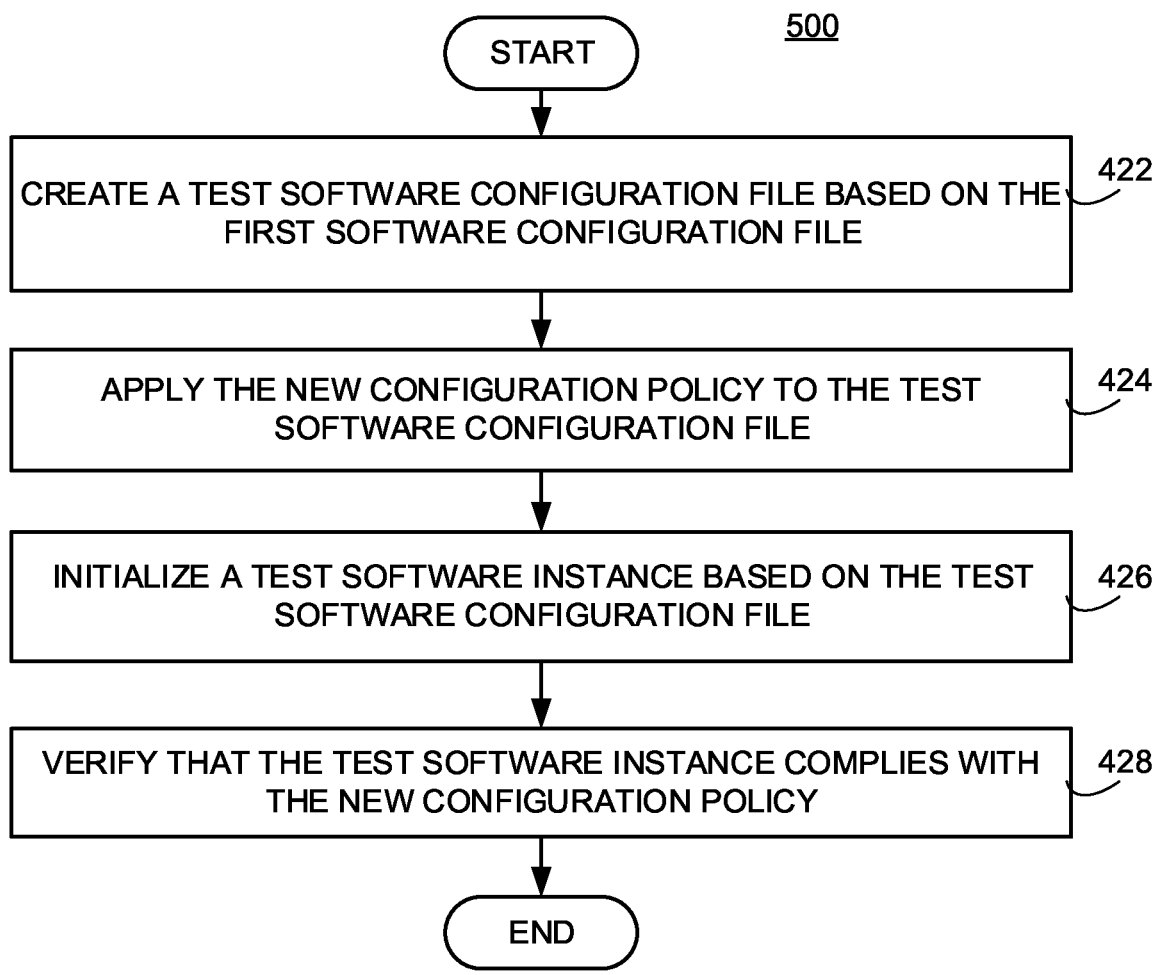
FIG. 5 is a flowchart of a method for validating a new configuration policy, according to an example embodiment.

In block 420, the system (e.g., compliance remediation system 110) may validate the new configuration policy, as described in more detail with respect to FIG. 5.

In block 430, after validation of the new configuration policy, the system (e.g., compliance remediation system 110) may apply the new configuration policy to the first software configuration file to remediate the first software instance. According to some embodiments, the compliance remediation system 110 may also generate for display a positive indication that the new configuration policy has remediated the first software instance. For example, the positive indication may be a check mark (e.g., a green checkmark), or a green circle, that may be displayed in a GUI next to an indication of the remediated first software configuration file. As another example, the positive indication may be the word "accepted" or "positive" displayed in the GUI. As a further example, the positive indication would be a mark or indicator in the metadata of the remediated first software configuration file.

FIG. 5 is a flowchart of a method for validating a new configuration policy, according to an example embodiment.

In block 422, the system (e.g., compliance remediation system 110) may create a test software configuration file based on the first software configuration file. The test software configuration file may be a clone of the first software configuration file before any new policies have been applied.

In block 424, the system (e.g., compliance remediation system 110) may apply the new configuration policy to the test software configuration file. According to some embodiments, the new configuration policy may be based on the modified first software configuration file as described in block 410.

In block 426, the system may initialize a test software instance based on the test software configuration file. Accordingly, the system may generate a test software virtual instance (e.g., software instance 132A, software instance 132B, software instance 132C, etc.) on the cloud computing system 130. After the virtual software instance is initiated on cloud computing system 130, it may be validated to determine if the new configuration policy remediated the identified compliance error.

In block 428, the system may verify that the test software instance complies with the new configuration policy. In other words, the system may verify that the test software instance (e.g., software instance 132A, software instance 132B, software instance 132C, etc.) operating on the cloud computing system 130 does not include any associated errors. This may be accomplished by compliance remediation system 110 and/or trigger monitoring system 120. According to some embodiments, trigger monitoring system 120 may verify that the test software instance complies with the new configuration policy by monitoring the test software instance for trigger data indicative of a compliance error.

Certain implementations provide the advantage of automatically determining whether a smart contract is likely in compliance with regulations.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Example Use Cases

The following example use case describes an example of a typical use of detecting an out of compliance software instance operating on a cloud service. It is intended solely for explanatory purposes and not in limitation. In one example, the system may receive trigger data indicating a software instance is out of compliance. For example, the respective software instance may be creating data logs that inadvertently publicly expose sensitive or private information. Trigger monitoring system may detect this compliance error in response to scanning the data log files generated by the software instance and comparing the contents of the datalog to terms or entries categorized as sensitive in the compliance repository. Accordingly, the trigger data may include the compliance error of "exposing customer social security numbers" when nine digit numbers in the form of XXX-XX-XXXX are detected within the data log. The compliance remediation system may then receive the trigger data from the trigger monitoring system, and identify the relevant remediation policy necessary to remediate a data log that leaks sensitive information, such a social security numbers. The compliance remediation system may then identify a software configuration file associated with the cloud software instance causing the compliance error, and apply the appropriate compliance remediation policy (e.g., tokenization or masking) to the software configuration file associated with the respective software instance. Accordingly, the next time the software instance is re-initialized based on the software configuration file, the appropriate remediation policy will be applied to the software instance, and data logs including sensitive data entries in the form of XXX-XX-XXXX may be tokenized or masked, depending on the appropriate remediation policy.

In another example, a software instance (e.g., software instance A) may be deployed to a cloud service with certain software dependencies. The trigger monitoring system 120 may identify each software dependency by parsing a configuration file associated with software instance A. Then, the trigger monitoring system may scan each software dependency to determine whether each dependency is compliant with the policies stored on compliance repository 140. Trigger monitoring system 120 may determine that a software dependency A is noncompliant with at least one policy stored on compliance repository 140. Accordingly, trigger monitoring system 120 may transmit a notification to compliance remediation system 110 to update the software dependency A to a compliant version, for example, by automatically updating software dependency A to a new software version.

In another example, an organization may mandate a new software configuration policy for software instances operating on a cloud computing system (e.g., cloud computing system 130). The new policy may be added to the compliance repository 140 by the organization. Compliance remediation system 110 and/or trigger monitoring system 120 may automatically determine that a new policy has been added to the compliance repository and identify one or more software instances that are not in compliance with the new software configuration policy. Accordingly, compliance remediation system may update software configuration files of each affected software instance to ensure that each software instance operating on cloud computing system is in compliance with the new policy.

Examples of the present disclosure can be implemented according to at least the following clauses:

Clause 1: A system for remediating a computer software configuration comprising: one or more processors; and a memory in communication with the one or more processors comprising instructions that, when executed by the one or more processors, are configured to cause the system to: store a plurality of configuration policies in a compliance repository, each configuration policy associated with a remediation of at least one compliance error of a plurality of compliance errors; receive trigger data, the trigger data indicating a first software instance of a plurality of software instances operating on a cloud service that is out of compliance, the trigger data comprising a first software instance identifier, and at least one first compliance error of the plurality of compliance errors; compare the at least one first compliance error with the plurality of configuration policies stored in the compliance repository; responsive to the at least one first compliance error matching at least one configuration policy beyond a first predetermined threshold: identify a first software configuration file based on the first software instance identifier; and apply the at least one matching configuration policy to the first software configuration file to remediate the first software instance; responsive to the at least one first compliance error not matching at least one configuration policy beyond the first predetermined threshold: generate a new configuration policy based at least in part on the at least one first compliance error; validate the new configuration policy; and apply the new configuration policy to the first software configuration file to remediate the first software instance.

Clause 2: The system of clause 1, wherein validating the new configuration policy comprises: creating a test software configuration file based on the first software configuration file; applying the new configuration policy to the test software configuration file; initializing a test software instance based on the test software configuration file; and verifying that the test software instance complies with the new configuration policy.

Clause 3: The system of clause 1, wherein the first software configuration file is configured to provide instructions to the cloud service for initializing the first software instance.

Clause 4: The system of clause 1, wherein generating a new configuration policy comprises modifying an existing configuration policy of the plurality of configuration policies.

Clause 5: The system of clause 1, wherein the trigger data comprises an indication that a runtime associated with deploying the first software instance to the cloud service exceeds a second predetermined threshold and the at least one matching configuration policy comprises identifying one or more dependencies associated with the first software instance and storing the one or more identified dependencies in a local repository.

Clause 6: The system of clause 1, wherein the at least one first compliance error comprises a datalog generated by the first software instance, the datalog comprising sensitive information.

Clause 7: The system of clause 1, wherein the at least one first compliance error comprises an out of compliance Bogiefile configuration, an out of compliance Gearsfile configuration, an out of compliance Dockerfile configuration, or combinations thereof.

Clause 8: A system for remediating a computer software configuration comprising: one or more processors; and a memory in communication with the one or more processors comprising instructions that, when executed by the one or more processors, are configured to cause the system to: store a plurality of configuration policies in a compliance repository, each configuration policy associated with a remediation of at least one compliance error of a plurality of compliance errors; collect trigger data, the trigger data indicating a first software instance of a plurality of software instances operating on a cloud service that is out of compliance, the trigger data comprising a first software instance identifier, and at least one first compliance error of the plurality of compliance errors; compare the trigger data to the plurality of configuration policies stored in the compliance repository; responsive to the trigger data matching at least one configuration policy beyond a first predetermined threshold: identify a first software configuration file based on the first software instance identifier; and apply the at least one matching configuration policy to the first software configuration file to remediate the first software instance.

Clause 9: The system of clause 8, wherein the memory includes instructions, that when executed by the one or more processors, are configured to cause the system to: responsive to the at least one first compliance error not matching at least one configuration policy beyond the first predetermined threshold: generate a new configuration policy based at least in part on the collected trigger data; validate the new configuration policy; and apply the new configuration policy to the first software configuration file to remediate the first software instance. \

Clause 10: The system of clause 9, wherein validating the new configuration policy comprises: creating a test software configuration file based on the first software configuration file; applying the new configuration policy to the test software configuration file; initializing a test software instance based on the test software configuration file; and verifying that the test software instance complies with the plurality of configuration policies.

Clause 11: The system of clause 8, wherein the first software configuration file is configured to provide instructions to the cloud service for initializing the first software instance.

Clause 12: The system of clause 8, wherein generating a new configuration policy comprises modifying an existing configuration policy of the plurality of configuration policies.

Clause 13: The system of clause 8, wherein the trigger data comprises an indication that a runtime associated with deploying the first software instance to the cloud service exceeds a second predetermined threshold and the at least one matching configuration policy comprises identifying one or more dependencies associated with the first software instance and storing the one or more identified dependencies in a local repository.

Clause 14: The system of clause 8, wherein the at least one first compliance error comprises a datalog generated by the first software instance, the datalog comprising sensitive information.

Clause 15: The system of clause 8, wherein the at least one first compliance error comprises an out of compliance Bogiefile configuration, an out of compliance Gearsfile configuration, an out of compliance Dockerfile configuration, or combinations thereof.

Clause 16: A method for remediating a computer software configuration comprising: storing a plurality of configuration policies in a compliance repository, each configuration policy associated with a remediation of at least one compliance error of a plurality of compliance errors; collecting trigger data, the trigger data indicating a first software instance of a plurality of software instances operating on a cloud service that is out of compliance, the trigger data comprising a first software instance identifier, and at least one first compliance error of the plurality of compliance errors; comparing the trigger data to the plurality of configuration policies stored in the compliance repository; responsive to the trigger data matching at least one configuration policy beyond a first predetermined threshold: identifying a first software configuration file based on the first software instance identifier; and applying the at least one matching configuration policy to the first software configuration file to remediate the first software instance.

Clause 17: The method of clause 16, further comprising: responsive to the at least one first compliance error not matching at least one configuration policy beyond the first predetermined threshold: generating a new configuration policy based at least in part on the collected trigger data; validating the new configuration policy; and applying the new configuration policy to the first software configuration file to remediate the first software instance.

Clause 18: The method of clause 17, wherein validating the new configuration policy comprises: creating a test software configuration file based on the first software configuration file; applying the new configuration policy to the test software configuration file; initializing a test software instance based on the test software configuration file; and verifying that the test software instance complies with the plurality of configuration policies.

Clause 19: The method of clause 16, wherein the at least one first compliance error comprises an error selected from a datalog generated by the first software instance wherein the datalog comprises sensitive information, an out of compliance Bogiefile configuration, an out of compliance Gearsfile configuration, an out of compliance Dockerfile configuration, or combinations thereof.

Clause 20: The method of claim 16, wherein the trigger data comprises an indication that a runtime associated with deploying the first software instance to the cloud service exceeds a second predetermined threshold and the at least one matching configuration policy comprises identifying one or more dependencies associated with the first software instance and storing the one or more identified dependencies in a local repository.

What is claimed is:

1. A system for remediating a computer software configuration comprising:
   one or more processors; and
   a memory in communication with the one or more processors comprising instructions that, when executed by the one or more processors, are configured to cause the system to:
      store a plurality of configuration policies in a compliance repository, each configuration policy associated with a remediation of at least one compliance error of a plurality of compliance errors;
      receive trigger data, the trigger data indicating a first software instance of a plurality of software instances operating on a cloud service that is out of compliance, the trigger data comprising a first software instance identifier, and at least one first compliance error of the plurality of compliance errors;
      compare the at least one first compliance error with the plurality of configuration policies stored in the compliance repository;
      responsive to the at least one first compliance error matching at least one configuration policy beyond a first predetermined threshold:
         identify a first software configuration file based on the first software instance identifier; and
         apply the at least one matching configuration policy to the first software configuration file to remediate the first software instance;
      responsive to the at least one first compliance error not matching at least one configuration policy beyond the first predetermined threshold:
         generate a new configuration policy based at least in part on the at least one first compliance error;
         validate the new configuration policy; and
         apply the new configuration policy to the first software configuration file to remediate the first software instance.

2. The system of claim 1, wherein validating the new configuration policy comprises:
   creating a test software configuration file based on the first software configuration file;
   applying the new configuration policy to the test software configuration file;
   initializing a test software instance based on the test software configuration file; and
   verifying that the test software instance complies with the new configuration policy.

3. The system of claim 1, wherein the first software configuration file is configured to provide instructions to the cloud service for initializing the first software instance.

4. The system of claim 1, wherein generating a new configuration policy comprises modifying an existing configuration policy of the plurality of configuration policies.

5. The system of claim 1, wherein the trigger data comprises an indication that a runtime associated with deploying the first software instance to the cloud service exceeds a second predetermined threshold and the at least one matching configuration policy comprises identifying one or more dependencies associated with the first software instance and storing the one or more identified dependencies in a local repository.

6. The system of claim 1, wherein the at least one first compliance error comprises a datalog generated by the first software instance, the datalog comprising sensitive information.

7. The system of claim 1, wherein the at least one first compliance error comprises an out of compliance Bogiefile configuration, an out of compliance Gearsfile configuration, an out of compliance Dockerfile configuration, or combinations thereof.

8. A system for remediating a computer software configuration comprising:
   one or more processors; and
   a memory in communication with the one or more processors comprising instructions that, when executed by the one or more processors, are configured to cause the system to:
      store a plurality of configuration policies in a compliance repository, each configuration policy associated with a remediation of at least one compliance error of a plurality of compliance errors;
      collect trigger data, the trigger data indicating a first software instance of a plurality of software instances operating on a cloud service that is out of compliance, the trigger data comprising a first software instance identifier, and at least one first compliance error of the plurality of compliance errors;
      compare the trigger data to the plurality of configuration policies stored in the compliance repository;
      responsive to the trigger data matching at least one configuration policy beyond a first predetermined threshold:
         identify a first software configuration file based on the first software instance identifier; and
         apply the at least one matching configuration policy to the first software configuration file to remediate the first software instance.

9. The system of claim 8, wherein the memory includes instructions, that when executed by the one or more processors, are configured to cause the system to:
   responsive to the at least one first compliance error not matching at least one configuration policy beyond the first predetermined threshold:
      generate a new configuration policy based at least in part on the collected trigger data;
      validate the new configuration policy; and apply the new configuration policy to the first software configuration file to remediate the first software instance.

10. The system of claim 9, wherein validating the new configuration policy comprises:
creating a test software configuration file based on the first software configuration file;
applying the new configuration policy to the test software configuration file;
initializing a test software instance based on the test software configuration file; and
verifying that the test software instance complies with the plurality of configuration policies.

11. The system of claim 8, wherein the first software configuration file is configured to provide instructions to the cloud service for initializing the first software instance.

12. The system of claim 8, wherein generating a new configuration policy comprises modifying an existing configuration policy of the plurality of configuration policies.

13. The system of claim 8, wherein the trigger data comprises an indication that a runtime associated with deploying the first software instance to the cloud service exceeds a second predetermined threshold and the at least one matching configuration policy comprises identifying one or more dependencies associated with the first software instance and storing the one or more identified dependencies in a local repository.

14. The system of claim 8, wherein the at least one first compliance error comprises a datalog generated by the first software instance, the datalog comprising sensitive information.

15. The system of claim 8, wherein the at least one first compliance error comprises an out of compliance Bogiefile configuration, an out of compliance Gearsfile configuration, an out of compliance Dockerfile configuration, or combinations thereof.

16. A method for remediating a computer software configuration comprising:
storing a plurality of configuration policies in a compliance repository, each configuration policy associated with a remediation of at least one compliance error of a plurality of compliance errors;
collecting trigger data, the trigger data indicating a first software instance of a plurality of software instances operating on a cloud service that is out of compliance, the trigger data comprising a first software instance identifier, and at least one first compliance error of the plurality of compliance errors;
comparing the trigger data to the plurality of configuration policies stored in the compliance repository;
responsive to the trigger data matching at least one configuration policy beyond a first predetermined threshold:
identifying a first software configuration file based on the first software instance identifier; and
applying the at least one matching configuration policy to the first software configuration file to remediate the first software instance.

17. The method of claim 16, further comprising:
responsive to the at least one first compliance error not matching at least one configuration policy beyond the first predetermined threshold:
generating a new configuration policy based at least in part on the collected trigger data;
validating the new configuration policy; and
applying the new configuration policy to the first software configuration file to remediate the first software instance.

18. The method of claim 17, wherein validating the new configuration policy comprises:
creating a test software configuration file based on the first software configuration file;
applying the new configuration policy to the test software configuration file;
initializing a test software instance based on the test software configuration file; and
verifying that the test software instance complies with the plurality of configuration policies.

19. The method of claim 16, wherein the at least one first compliance error comprises an error selected from a datalog generated by the first software instance wherein the datalog comprises sensitive information, an out of compliance Bogiefile configuration, an out of compliance Gearsfile configuration, an out of compliance Dockerfile configuration, or combinations thereof.

20. The method of claim 16, wherein the trigger data comprises an indication that a runtime associated with deploying the first software instance to the cloud service exceeds a second predetermined threshold and the at least one matching configuration policy comprises identifying one or more dependencies associated with the first software instance and storing the one or more identified dependencies in a local repository.

* * * * *